United States Patent [19]
Gaupp et al.

[11] Patent Number: 5,395,045
[45] Date of Patent: Mar. 7, 1995

[54] SUPPORT RAILS FOR SHAFTS

[75] Inventors: Daniel Gaupp, Uhlwiller; Jean-Marc Jaeger, Haguenau, both of France

[73] Assignee: Ina Techniques Lineaires, France

[21] Appl. No.: 136,535

[22] Filed: Oct. 14, 1993

[30] Foreign Application Priority Data

Oct. 14, 1992 [EP] European Pat. Off. ......... 92440114

[51] Int. Cl.⁶ ............................................. E01B 5/00
[52] U.S. Cl. ................................... 238/143; 238/122; 238/138
[58] Field of Search ............... 238/122, 126, 134, 138, 238/141, 145, 146, 143; 104/126, 118, 134; 105/141; 384/29, 43, 44

[56] References Cited

U.S. PATENT DOCUMENTS 3,194,178  7/1965  Weston ................. 238/122
4,264,112  4/1981  Magnuson ................. 384/29

FOREIGN PATENT DOCUMENTS 1076723  3/1960  Germany ................. 238/122

*Primary Examiner*—Mark T. Le
*Attorney, Agent, or Firm*—Bierman and Muserlian

[57] ABSTRACT

An extruded aluminum alloy rail for supporting a shaft for a linear guidance system, the rail comprising a vertical body with a longitudinal notch on its upper surface for receiving the shaft along two generatrixes and a pair of symmetrical longitudinal wings at its base for resting on a fixed stand, the wings being configured so that only the smallest possible surface areas of the wing rest on the support supporting the rail which together with bushed ball bearings support shafts for assuring the linear guidance of high precision modules or mobile platens.

5 Claims, 1 Drawing Sheet

SUPPORT RAILS FOR SHAFTS

STATE OF THE ART

Extruded rails of an aluminum alloy used together with bushed ball bearings to support shafts intended for assuring the linear guidance of high-precision modules or mobile platens have the cross-section of a vertical body comprising on its upper surface a longitudinal concave notch for supporting the shaft along two generatrixes, and the vertical body further comprising on each side of its base, symmetrical longitudinal wings for supporting or fixing the rail on a support. In consideration of the precision of the equipment involved, tolerance requirements are very close, on the order of ±0.02 mm for the distance between the axis of the supported shaft and the bottom surface of the base plate formed by the wings.

Unfortunately, it is inherent in the extrusion process that from a certain length on, the wings tend to sag or arch in an uncontrollable manner. As a result, present-day techniques of manufacturing such rails involve their extrusion with a slight over-thickness and subsequent machining by milling both the notch and the base plate to be able to respect tolerance requirements and this leads to higher manufacturing costs and imposes restrictions on the length of the rails.

OBJECTS OF THE INVENTION

It is an object of the invention to eliminate these disadvantages by making it possible to manufacture such aluminum alloy rails by extrusion with a practically unlimited length while respecting the imposed tolerances without the need of subsequent machining.

This and other objects and advantages of the invention will become obvious from the following detailed description.

THE INVENTION

This object is achieved by the invention in that the said base plate is shaped so as to rest on the support only by the smallest possible support surface which characteristic is obtained in practice by the fact that the outer edges of the wings are raised so that only two very narrow longitudinal surfaces remain in contact with the support and the shape of the wings obtained by extrusion does not influence the required tolerance. Thus, by virtue of this profile, it is possible to eliminate the machining of the base plate and the notch and obtain a finished rail of any length with the required precision by extrusion.

For the type of equipment concerned, and particularly for linear platens moving on horizontal surfaces, it has already been proposed to improve the precision of evenness of seating by reducing the contact surface. However, thus far, this only implied a partial reduction of the central area of the platen with no influence on the precision of the height of the platen on its support surface. In contrast, it is the object of the invention to obtain this precision in the distance between the shaft axis and the support to provide the maximum possible reduction of the surface of contact of the rail with the support.

REFERRING NOW TO THE DRAWINGS

Figure 1:
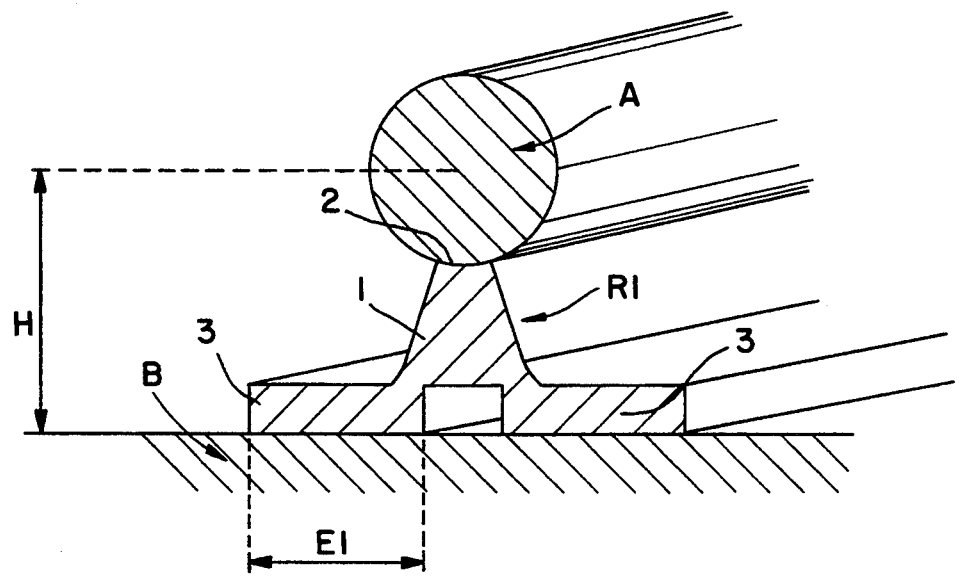
FIG. 1 illustrates a prior art support rail for a shaft.

FIG. 1 shows a rail $R_1$ on which a shaft A is supported and rail $R_1$ rests on a support B to which it can be fixed for example by screws (not shown). In its known form, this rail $R_1$ comprises a vertical body 1 with a longitudinal V-shaped notch 2 on its upper surface and a pair of horizontal wings 3 at its base, and the entire surface $E_1$ of each of the wings rests on the support B.

Linear guiding systems in which a shaft such as A is used impose very close tolerances, the distance H between the base of the wings 3 and the axis of the shaft A having a tolerance of about ±0.02 mm. For respecting these tolerances, the state of the art requires machining of both the base as well as the notch 2 after extrusion.

Figure 2:
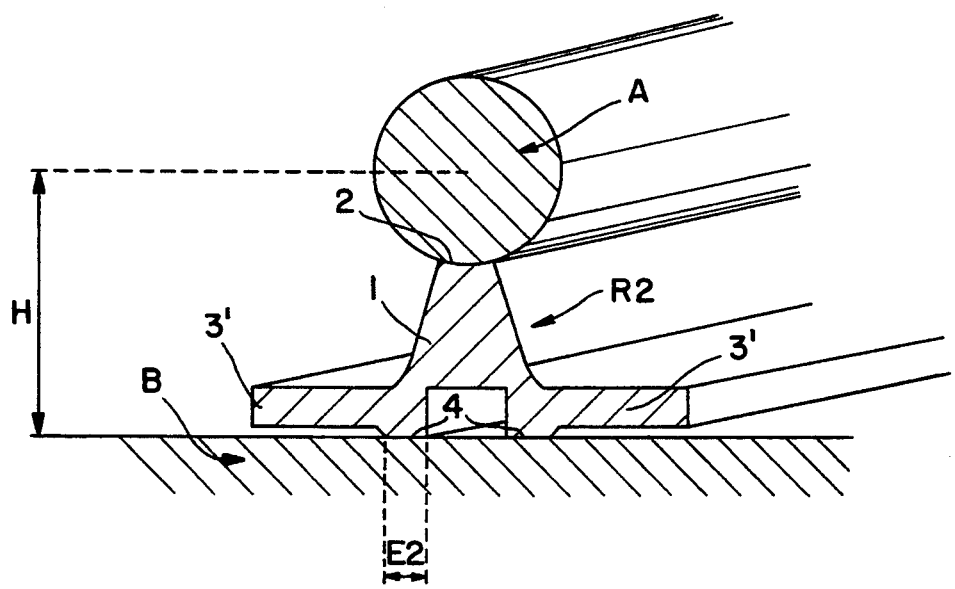
FIG. 2 is an embodiment of an improved rail of the invention.

The shape of the rail $R_2$ of FIG. 2 makes it possible to eliminate this double machining operation. To achieve this, the wing 3' are raised above the support B except for a very narrow area 4 so that only two very narrow surfaces $E_2$ of the rail which have the smallest possible surface area rest on the support. By this configuration, the dimension H maintains its desired tolerance irrespective of any deformation to the wings 3' resulting from the extrusion process or from subsequent stressing for example by the tightening of fixing screws on the support.

The degree and the form of raising the outer edges of the wings 3' are not critical, the object of the invention being exclusively to achieve the smallest possible support surface $E_2$. Thus, the raising of the wings can be obtained by making a recess of any cross-section in the base of the wings provided that this recess assures an absence of contact between the wings and the support except in minimal areas $E_2$ which, in the limit case, can be line-shaped.

The invention concerns all rails of the pre-cited type irrespective of their use in the field of linear guidance, for example, the guidance of modules, linear platens and the like, and irrespective of the cross-section of the notch 2 which may be in the form of V or a U or have any other shape provided that, likewise for the sake of precision, the shaft A rests on the rail only along two linear generatrixes. In certain uses, it is also possible for the upper surface of the body 1 to have no notch at all, for instance, if the body 1 constitutes a raising block having a convex upper surface.

Various modifications of the rails of the invention may be made without departing from the spirit or scope thereof and it should be understood that the invention is intended to be limited only as defined in the appended claims.

What we claim is:

1. An extruded aluminum alloy rail for supporting a shaft for a linear guidance system, the rail comprising a vertical body with a longitudinal notch on its upper surface for receiving the said shaft along two generatrixes and a pair of symmetrical longitudinal wings with surface areas at its base for resting on a fixed support, the said wings being configured so that only the smallest possible surface areas of the wings rest on the support supporting the rail wherein an outer edge of each wing is raised above the support whereby a very narrow center strip is an inner region of each wing is in contact with the support.

2. A rail of claim 1 wherein the central narrow strip is line-shaped.

3. A rail of claim 1 wherein the rail is extruded in lengths of defined dimensions and tolerances without machining.

4. A linear guidance system shaft supported by a rail of claim 1.

5. A linear guidance system shaft supported by a rail of claim 1 as a raising block provided with a convex upper surface.

* * * * *